United States Patent [19]

Kawahara

[11] Patent Number: 4,572,213
[45] Date of Patent: Feb. 25, 1986

[54] ABNORMAL CONDITION DETECTING SYSTEM IN AN ELECTRONIC THERMOMETER

[75] Inventor: Masafumi Kawahara, Nara, Japan
[73] Assignee: Sharp Kabushiki Kaisha, Osaka, Japan
[21] Appl. No.: 506,762
[22] Filed: Jun. 22, 1983
[30] Foreign Application Priority Data Jun. 24, 1982 [JP]  Japan ................................. 57-109456

[51] Int. Cl.⁴ .............................................. A61B 5/00
[52] U.S. Cl. ..................................... 128/736; 374/104
[58] Field of Search ................ 128/736; 374/102–104, 374/111–112

[56] References Cited

U.S. PATENT DOCUMENTS

| 3,933,045 | 1/1976 | Fox et al. | 128/736 X |
| 4,031,365 | 6/1977 | Raggiotti et al. | 128/736 X |
| 4,278,970 | 7/1981 | Streczyn et al. | 128/736 X |
| 4,294,263 | 10/1981 | Hochman | 128/736 |
| 4,295,475 | 10/1981 | Torzala | 128/736 |
| 4,297,685 | 10/1981 | Brainard, II | 128/736 X |
| 4,331,161 | 5/1982 | Patel | 128/736 |
| 4,377,171 | 3/1983 | Wada | 128/736 |
| 4,399,823 | 8/1983 | Donnelly | 128/736 |

OTHER PUBLICATIONS

Kingma et al., "Wireless Fever Alarm Device"; *Med. and Biol. Eng. and Comput.*, 7-1979, pp. 550–552.

Primary Examiner—Lee S. Cohen
Assistant Examiner—Angela D. Sykes
Attorney, Agent, or Firm—Birch, Stewart, Kolasch & Birch

[57] ABSTRACT

An electronic thermometer of the highest value holding type includes a highest temperature memory for storing the highest value, and a temporary memory for temporarily storing the now detected temperature. An adder is provided for adding a predetermined value, for example, 1.5° C. to the now detected temperature temporarily stored in the temporary memory. A comparator compares the addition result with the highest value stored in the highest temperature memory, and develops an abnormal condition detecting signal when the addition result is smaller than the highest value, thereby alarming an abnormal condition.

11 Claims, 1 Drawing Figure

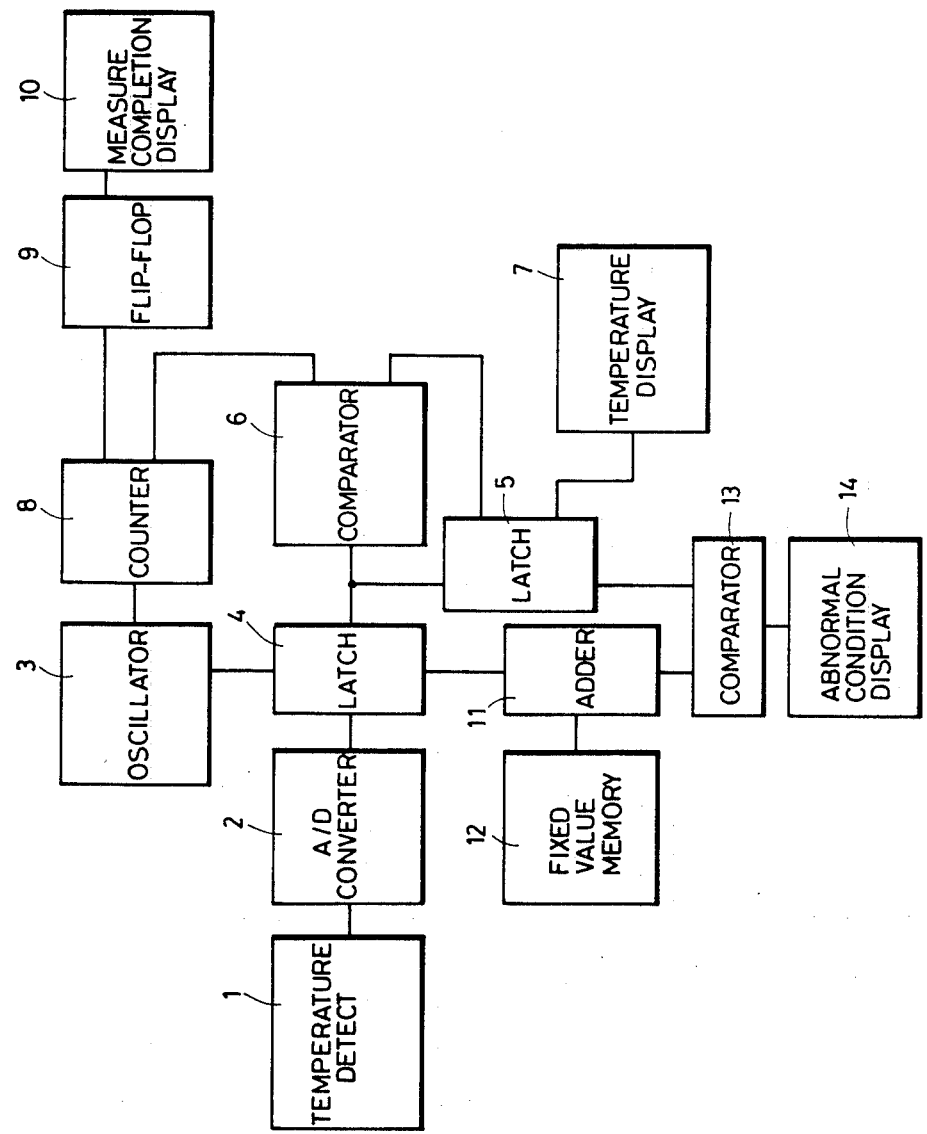

ABNORMAL CONDITION DETECTING SYSTEM IN AN ELECTRONIC THERMOMETER

BACKGROUND AND SUMMARY OF THE INVENTION

The present invention relates to an electronic thermometer and, more particularly, to an abnormal condition detecting system in an electronic thermometer.

Recently, an electronic, clinical thermometer has been developed, which employs the temperature measuring system of the highest value holding type. The highest value holding system determines the completion of the temperature measuring operation when the highest value does not change for a period longer than a preselected period of time.

A typical construction of the electronic thermometer is disclosed in U.S. Pat. No. 4,377,171, entitled "ELECTRONIC THERMOMETER", issued on Mar. 22, 1983. In such an electronic thermometer, an accurate measurement is not ensured when a sensor probe is erroneously separated from a desired portion of a body of a person to be measured before the measurement completion signal is developed.

Accordingly, an object of the present invention is to provide an electronic, clinical thermometer which ensures an accurate measurement operation.

Another object of the present invention is to provide an abnormal condition detection system in an electronic thermometer for visually or audibly alarming an abnormal condition of the electronic thermometer.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, the measured highest value is stored in a first memory means. The temperature value now measured is introduced into a second memory means. A fixed value, for example, 1.5° C. is added to the now measured value, and the addition result is compared with the highest value stored in the first memory means. If the addition result is smaller than the highest value stored in the first memory means, a determination system determines that the electronic thermometer is in an abnormal condition.

In another preferred form, the temperature value now measured and introduced into the second memory means is compared with a fixed value, for example, 35° C. If the now measured value is smaller than the fixed value, a determination system develops a control signal to announce an abnormal condition of the electronic thermometer.

In still another preferred form, a fixed ratio, for example, 0.99 is multiplied by the highest value stored in the first memory means. The product is compared with the now measured value. If the now measured value is smaller than the product, a determination system determines that the electronic thermometer is in an abnormal condition.

BRIEF DESCRIPTION OF THE DRAWING

The present invention will be better understood from the detailed description given hereinbelow and the accompanying drawing which is given by way of illustration only, and thus is not limitative of the present invention and wherein:

The single drawing FIGURE is a block diagram of an embodiment of an electronic thermometer of the present invention.

DESCRIPTION OF THE PREFERRED EMBODIMENTS

The electronic thermometer of the present invention includes a temperature detecting unit 1 which contacts a desired portion of a body of a person to be measured. The temperature detecting unit 1 preferably includes a thermistor. An output signal of the temperature detecting unit 1 is applied to an analog-to-digital converter 2 for obtaining a digital value representing the now detected temperature. The thus obtained digital value is latched in a latch circuit 4 in response to a reference clock signal developed from an oscillator 3. That is, the latch circuit 4 temporarily stores the temperature value now detected by the temperature detecting unit 1.

A first comparator 6 compares the temperature value temporarily stored in the latch circuit 4 with a temperature value stored in another latch circuit 5, and transfers a larger value to the latch circuit 5. That is, the latch circuit 5 stores the highest temperature value detected by the temperature detecting unit 1. The highest temperature value stored in the latch circuit 5 is applied to a temperature display unit 7 for visually displaying the highest temperature detected by the temperaure detecting unit 1.

A counter 8 is connected to the first comparator 6 so that the counter 8 continues the counting operation when the first comparator 6 detects that the highest temperature stored in the latch circuit 5 is greater than or equal to the now detected temperature which is temporarily stored in the latch circuit 4. When the count contents stored in the counter 8 reach a predetermined value, for example, a value corresponding to thirty (30) seconds, the counter 8 develops a set signal to a flip-flop 9. A set output signal of the flip-flop 9 is applied to a measurement completion indicating unit 10 to display the completion of the measuring operation. The measurement completion indicating unit 10 is preferably a buzzer for audibly announcing the completion of the temperature measuring operation. When the highest temperature stored in the latch circuit 5 is smaller than the present data temporarily stored in the latch circuit 4, the first comparator 6 develops a clear signal to the counter 8 for re-starting the counting operation. That is, the measuring operation is completed when the highest value stored in the latch circuit 5 does not change for a period longer than a preselected period, for example, thirty (30) seconds.

In such a system, if the temperature detecting unit 1 is erroneously separated from the desired portion of the body of the person to be measured before the counter 8 develops the set signal, the following data applied to the latch circuit 4 becomes lower than the highest value stored in the latch circuit 5. Therefore, the counter 8 continues the counting operation to develop the set signal to the flip-flop 9. However, it will be clear that the highest value stored in the latch circuit 5 does not show the body temperature to be measured.

The above-mentioned abnormal condition is detected by the electronic thermometer of the present invention.

The now detected temperature data temporarily stored in the latch circuit 4 is further applied to an adder 11. A fixed value memory 12 is connected to the adder 11 so that a fixed value, for example, 1.5° C. is added to the now detected value temporarily stored in the latch circuit 4. The addition result is applied to a second comparator 13 which compares the addition result with the highest temperature stored in the latch circuit 5. If the addition result derived from the adder 11 is smaller than the highest temperature stored in the latch circuit 5, the second comparator 13 develops a control signal to enable an abnormal condition display unit 14. The abnormal condition display unit 14 can be a lamp for visually alarming the abnormal condition, or can be a buzzer for audibly alarming the abnormal condition. The fixed value stored in the fixed value memory 12 is not limited to 1.5° C. When a further accurate measurement is required, the fixed value stored in the fixed value memory 12 may be selected at a value smaller than 1.5° C.

In another embodiment of the present invention, the now detected temperature value temporarily stored in the latch circuit 4 is compared with a fixed value, for example, 35° C. If the now detected temperature is smaller than 35° C., the abnormal condition display unit 14 is enabled.

In still another embodiment of the present invention, a multiplier is provided for multiplying the highest value stored in the latch circuit 5 by a fixed ratio, for example, 0.99. The product is compared with the now detected temperature temporarily stored in the latch circuit 4. If the now detected temperature derived from the latch circuit 4 is smaller than the product derived from the multiplier, the abnormal condition display unit 14 is energized.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic thermometer comprising:
   temperature detecting means for detecting a body temperature of a person to be measured, said temperature detecting means adapted to be in contact with a selected portion of the body of said person;
   means for detecting separation of said electronic thermometer from said selected portion of said body while measuring the body temperature of the person including,
   comparing means for comparing the actually detected body temperature derived from said temperature detecting means with a preselected value, and for developing a control signal when said body temperature derived from said temperature detecting means is smaller than said preselected value; and alarm means for indicating separation of the electronic thermometer from said selected portion of said body in response to said control signal.

2. The electronic thermometer of claim 1, wherein said preselected value is 35° C.

3. An electronic thermometer comprising:
   temperature detecting means for detecting a body temperature of a person to be measured, said temperature detecting means adapted to be in contact with a selected portion of the body of said person;
   means for detecting separation of said electronic thermometer from said selected portion of said body while measuring the body temperature of the person including,
   temporary storage means for temporarily storing temperature data derived from said temperature detecting means,
   highest value storage means for storing the highest temperature derived from said temperature detecting means,
   comparing means for comparing said temperature data temporarily stored in said temporary storage means with a preselected value, and for developing a control signal when said body temperature data temporarily stored in said temporary storage means is smaller than said preselected value; and
   alarm means for indicating separation of the electronic thermometer from said selected portion of said body in response to said control signal.

4. The electronic thermometer of claim 3, further comprising:
   another comparing means for comparing said temperature data temporarily stored in said temporary storage means with said highest temperature stored in said highest value storage means; and
   transfer means for transferring a higher value of said temperature data and said highest temperature to said highest value storage means, in response to the comparison result of said another comparing means.

5. The electronic thermometer of claim 4, wherein said preselected value is 35° C.

6. The electronic thermometer of claim 4, wherein said preselected value is a value which is smaller than said highest temperature stored in said highest value storage means by a predetermined value.

7. The electronic thermometer of claim 6, wherein said predetermined value is 1.5° C.

8. The electronic thermometer of claim 4, wherein said preselected value is a product which is obtained by multiplying said highest temperature stored in said highest value storage means by a predetermined ratio.

9. The electronic thermometer of claim 8, wherein said predetermined ratio is 0.99.

10. An electronic thermometer comprising:
    temperature detecting means for detecting a body temperature of a person to be measured;
    means for detecting an abnormal condition in an electronic thermometer while measuring the body temperature of a person including,
    temporary storage means for temporarily storing temperature data derived from said temperature detecting means,
    highest value storage means for storing the highest temperature derived from said temperature detecting means,
    a first comparator means for comparing said temperature data temporarily stored in said temporary storage means with said highest temperature stored in said highest value storage means,
    transfer means for transferring a higher value of said temperature data and said highest temperature to said highest value storage means, in response to the comparison result of said first comparator means, an adder means for adding a predetermined value to said temperature data temporarily stored in said temporary storage means, a second comparator means for comparing an addition result derived from said adder means with said highest temperature stored in said highest value storage means, and for developing a control signal when said addition result is smaller than said highest temperature; and alarm means for indicating an abnormal condition of the electronic thermometer in response to said control signal developed from said second comparator means.

11. The electronic thermometer of claim 10, further comprising:

a counter means, connected to said first comparator means, for counting a time period during which said highest temperature stored in said highest value storage means does not change, and for developing a determination output when said time period reaches a predetermined period; and measurement completion display means for displaying a completion of the measuring operation when said determination output is developed from said counter means.

* * * * *